Dec. 11, 1956  H. L. RANSON  2,773,306
ELECTRICAL RAZOR
Filed Dec. 6, 1951  3 Sheets-Sheet 1
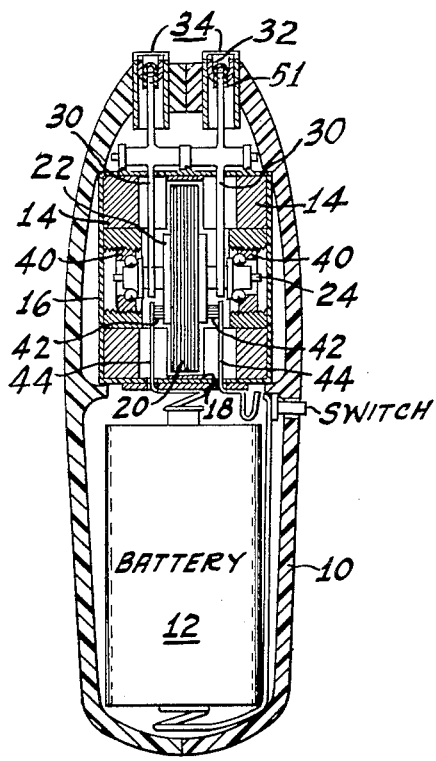
Fig_1
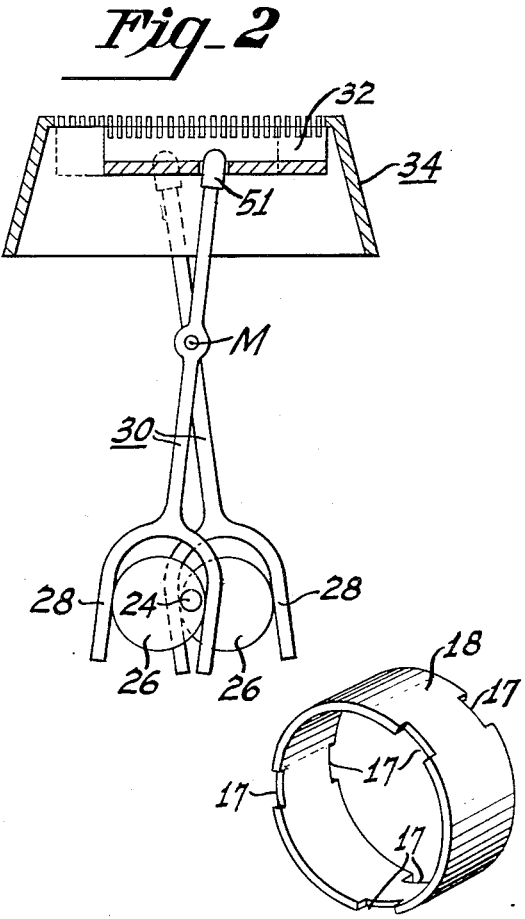
Fig_2
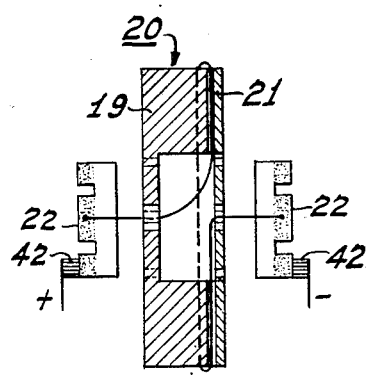
Fig_3
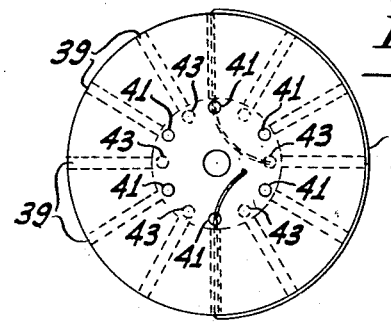
Fig_4
INVENTOR
Harry L. Ranson
BY
Charles H. Brown
ATTORNEY

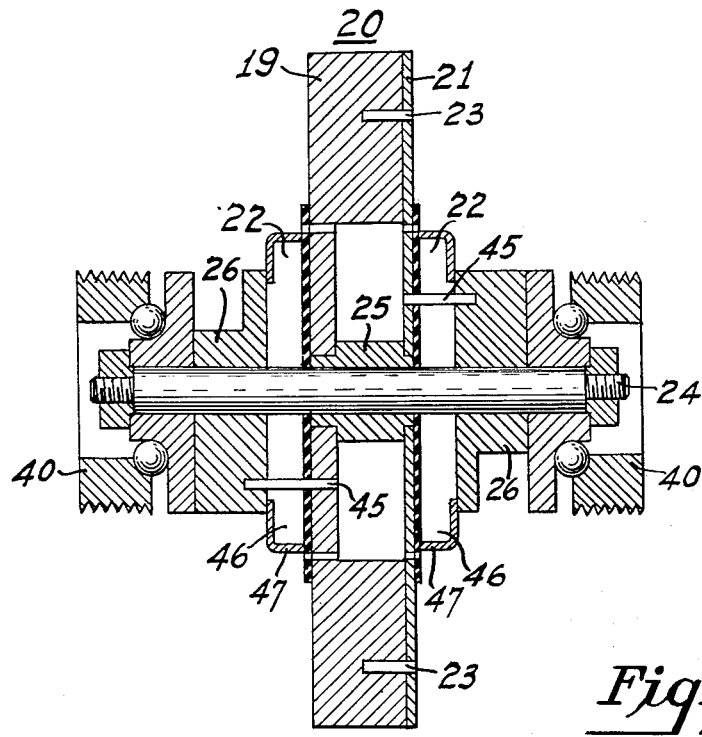
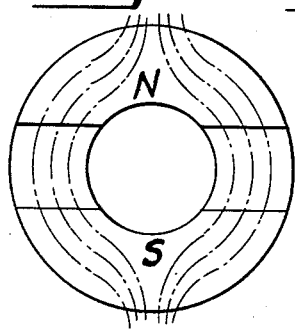
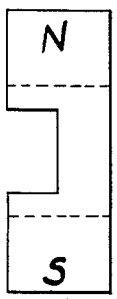
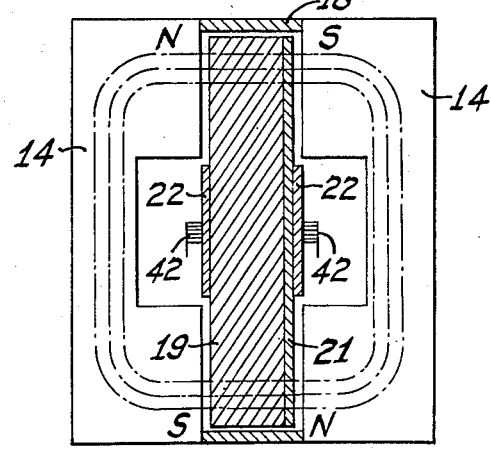

Dec. 11, 1956 H. L. RANSON 2,773,306
ELECTRICAL RAZOR
Filed Dec. 6, 1951. 3 Sheets—Sheet 3
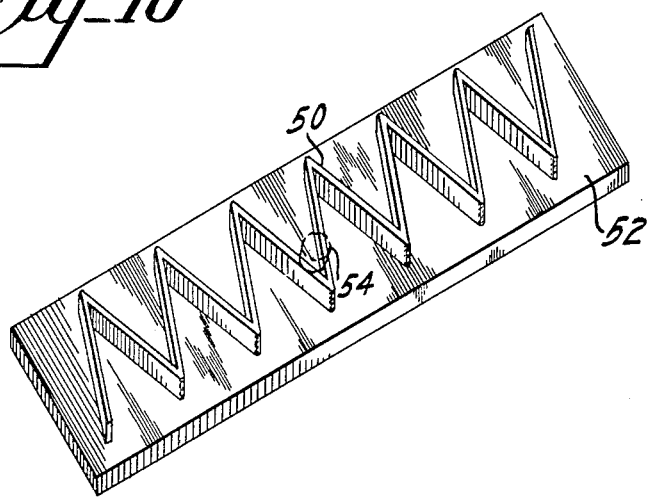
Fig_10
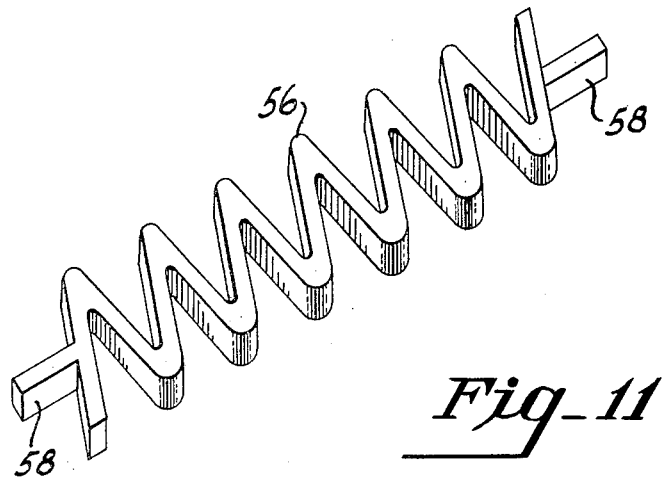
Fig_11
INVENTOR
Harry L. Ranson
BY
Charles H. Brown
ATTORNEY

United States Patent Office 2,773,306
Patented Dec. 11, 1956

2,773,306

ELECTRICAL RAZOR

Harry Leo Ranson, New York, N. Y.

Application December 6, 1951, Serial No. 260,147

5 Claims. (Cl. 30—43)

This invention relates to improvements in electrical appliances, such as electric dry shavers and to electric motors suitable for use therein.

The types of electric dry shavers currently manufactured and sold fall substantially into two distinct categories: (a) those designed to operate from the electric supply mains and (b) those designed to operate from a battery or batteries, where the latter may be housed in the shaver case, or be separately housed in a battery case connected to the shaver by flexible conductor.

A difficulty commonly experienced with these shavers is the excessive vibration, noise and out-of-balance effects caused to a large degree by the lack of perfect symmetry and balance in the construction and arrangement of the components making up the shaver. This vibration is especially noticeable when the shaver is provided with twin or dual shaving heads. The cutters for these twin heads, in such known dry shavers, operate in the same direction at all times and reach the ends of their travel together. Noise and vibration in these shavers is also caused by unnecessary space and lack of any shock-absorbing device between the cutter and the driving arm. This space exists initially and enlarges after operation of the shaver, due to wear and tear of the driving elements which directly engage the cutter.

Another trouble experienced in using some known types of electric dry shavers falling in category (a) is that the motor does not start-up upon inserting the electric cord into the electric supply outlet, without some manual manipulation on the part of the user and when used on electric supply mains arcing often occurs at the points or brushes of the commutated or impulse motor types.

As for the battery-operated shaver falling in category (b), the principal limitations have been the small power available from batteries of convenient size, the low efficiency of the motors driving the shaving head mechanism, and the consequent inability to drive simultaneously two or more cutting head mechanisms at the high speed essential to efficient shaving.

The utility value of an efficient, battery-operated, self-contained dry shaver is clearly established for residents of districts not supplied with electric power, and for travelers, etc., where a suitable electric supply is not always available. If such a battery-operated dry shaver were powered by a type and size of battery, housed in the shaver case, which was obtainable throughout the world, its utility would be further enhanced, while if the motor torque and speed were adequate to drive two cutting head mechanisms, an increased speed of shaving would result, with the attendant advantage of a shorter period of current drain from the battery.

The foregoing difficulties and troubles are overcome by the present invention which has for some of its objects: To provide an electric dry shaver whose elements are dynamically balanced to reduce vibration to an absolute minimum; to provide an electric dry shaver having a pair of cutting heads with means for operating the cutters simultaneously but always out-of-phase with respect to each other; to reduce vibration and wear in an electric dry shaver by cancelling opposing forces, thereby enabling smoother operation during shaving; to provide an electric shaver wherein the forces driving the cutting heads counterbalance one another, the force applied to one cutting head being 180° out-of-phase to the force applied to the adjacent cutting head of the same twin; to provide a small power motor suitable for use in an electric dry shaver and having greater torque than known types of motors used for a similar purpose; to provide a novel motor having a rotor including of a pair of similarly constructed commutators symmetrically positioned opposite sides of the armature, there being a direct-current circuit for each segment of one commutator to the correspondingly positioned segment of the other commutator through a winding on the armature; to provide an efficient motor with a dynamically balanced rotor whose armature has a radial dimension appreciably greater than its axial dimension, the rotor being provided with a pair of commutators positioned on opposite sides of the armature and requiring a closed circuit through segments on both commutators for operation of the rotor; to simplify a method of manufacture of the moving shear blade of the dry shaving head; to provide a shaving head which cuts hairs with a pure and progressive shearing action; and to provide an entirely self-contained electrically-operated dry shaver which is completely free from the possibility of giving rise to harmful electric shocks.

A feature of the invention, among others, is the sawtooth-shaped cutting shear which enables the cutting edges of the blades to cut the hairs with a progressive shearing action.

Although the miniature motor of the invention is hereinafter described as being particularly useful in an electric dry shaver, it should be understood that the motor is not limited to use in shavers but may have other applications entirely unrelated to shavers.

Other objects of the invention will appear from a reading of the following description which is accompanied by a drawing, wherein:

Fig. 1 illustrates, in cross-section, the improved electric dry shaver and novel motor of the invention;

Fig. 2 illustrates the operation of eccentrics or cams which drive the cutter heads in opposing phase relation by means of rocker arms;

Fig. 3 is an exploded view, in cross-section, of the essential parts of the improved rotor comprising armature and oppositely disposed commutators, with only one "D" winding shown to illustrate the principles involved;

Fig. 4 is an elevation view of the armature core per se, showing the slots to receive and hold the coil windings, and the holes for the lead-outs and lead-ins extending from the coil windings to the commutators. Only one coil winding is shown to illustrate the principles involved;

Fig. 5 is a sectional view of the rotor of the invention, together with the spindle or shaft, and associated eccentrics and bearing races;

Fig. 6 illustrates the details of the spacing collar which surrounds the armature;

Figs. 7 and 8 show front and side views respectively of each of the specially shaped permanent magnets of the rotor;

Fig. 9 is a simplified view of the magnetic circuit of the motor of the invention, merely showing the bare armature core, the magnets, the spacer between the magnets, the commutator and the brushes; and Figs. 10 and 11 disclose improved constructions of the inner cutting shear which may be used in electric dry shavers, and preferably with the electric shaver of the present invention.

Throughout the figures of the drawing, the same parts are designated by the same reference numerals.

Referring to Fig. 1, the dry shaver has an outer plastic housing or casing 10 containing therein, in addition to the motor parts, a suitable source of power supply 12. Supply 12 may be a 1½ volt dry battery, which in this non-limiting example is of a size universally known as "U.2" in the United Kingdom, "L" in Canada and "D" in the United States.

The motor within the outer plastic housing 10 includes a stator comprising two ring-shaped permanent magnets 14 of a suitably selected alloy, for example, Alnico, Ticonal, etc. and which may, for example, be the design shown in Figs. 7 and 8. These magnets are housed, with their polar surfaces facing one another, in a suitable non-ferrous casing of synthetic plastic or other non-magnetic material as shown at 16. The magnets are restrained apart by a ring-like spacing collar 18 of non-magnetic material, such as brass, aluminum, or plastic, or other similar means to a distance suitable for the unrestricted rotation of the armature 20 located within the collar. The armature which is of substantially ferrous material, is proportioned with an unusually high diameter-to-axial length ratio. The reasons for this high ratio are (1) to obtain the maximum possible torque, and (2) to allow a symmetrical armature spindle assembly, with rocker arms, to actuate two cutting heads as explained later.

In the case of reason (1) the size of motor is clearly limited by the permissible convenient dimensions of the shaver case. This factor also limits the magnet size and consequently the magnetic flux density traversing the armature disc. If then account is taken of the maximum battery current available, the only possible variant affecting motor torque is the radius at which the armature conductors are operative, and the highest possible figure for this is only attainable in a motor of this type.

Figs. 7 and 8 indicate two different views of each of the permanent magnets 14. The letters N and S designate the north and south poles respectively. The curved dot and dash lines of Fig. 7 and 9 are intended to designate the flux lines passing through the permanent magnets.

On opposite sides of the armature 20 but insulated therefrom are disc-type commutators 22 on a common spindle 24, together with a pair of eccentrics or cams 26, see Figs. 2 and 5, which engage the forked or slotted ends 28 of rocker arms 30 transmitting short-amplitude simple harmonic or other suitable reciprocating motion to the moving part 32 of the perforated cutting head or heads 34. These heads may have slots or holes as in conventional heads.

The eccentrics 26, it should be noted, are mounted on opposite ends of the armature, 180 degrees out-of-phase with respect to each other so as to cause the rockers 30, to pivot on a common shaft M, in such manner that the rocker arms are always moving simultaneously in opposite directions.

These cutting heads may, if desired, be of conventional contemporary design in which a moving slotted or perforated shear blade is kept in intimate contact with a fixed slotted or perforated shear blade. The moving blade is permitted sufficient travel, in sliding against the fixed blade, to ensure effective shearing of the hairs in shaving. Should other known types of cutting head be employed, then the motor of the invention may also be employed as a source of power, using a modified form of coupling between the motor spindle and the cutting head or heads, as requirements dictate.

It is preferred, however, to use a novel type of cutting or shear blade for each of the two heads, which by virtue of its configuration provides a true and progressive shearing action having a diagonal shearing moment. This preferred type of cutter is described hereinafter in detail.

The armature 20 shown essentially as a bare rotor core, Figs. 3 and 5 for simplicity of illustration, comprises an annulus 19 of ferrous material having a relatively large cut-out portion, and an end plate or disc 21 also of ferrous material, both held together by dowel pins 23 and suitably mounted on the central spindle or shaft 24 by a stepped steel sleeve or distance piece 25. The core 19 is made of a mild steel or iron which may be annealed to achieve greater permeability characteristics, and may or may not be laminated, or of other suitable magnetic material, such as powdered iron.

The active length of the armature conductors may be carried in a number of radial slots, either internally in the plane of the armature disc, or externally on either or both faces, so long as there is a coil in proximity to the core of iron. The former type is shown diagrammatically in Fig. 4.

The armature core 19 is provided with twelve slots 39 machined in the rotor core to receive and hold the coil windings. Each pair of diametrically opposite slots hold one coil. There are six holes 41 in the core 19 for the leads-out from the coils to one commutator, for example, the left hand commutator connected via a brush to the positive terminal of battery 12, and there are six holes 43 in the end plate 21 for the leads-in from the other commutator to the coils.

The armature 20 is preferably retained centrally between the magnets 14 by providing it with adjustable bearings, preferably using ball races, one manner of adjustment being shown by the threaded arrangement 40. Such bearings, having low frictional resistance, enhance the overall efficiency of the motor.

The spacing collar 18, as stated before, surrounds the armature 20 concentrically and acts as a spacer between the two magnets 14. As will be observed from an inspection of Fig. 6 showing the spacing collar in detail, it is a cylinder in whose opposite faces are provided a plurality of symmetrically arranged recesses 17. These recesses 17 in the cylinder faces which butt against the machined faces of the magnets serve to permit the insertion of non-magnetic feeler gauges between the magnet and armature adjacent faces in order to enable the balancing of the gaps on both sides of the armature during assembly, locked by means of the bearing adjusters 40 at opposite ends of the spindle 24, thus ensuring permanent magnetic balance, so far as is practicable and also minimum end play and friction.

To ensure precise location of the two magnets 14, both in relation to one another and also in relation to the rest of the armature assembly, and to ensure that the "feeler gauge" apertures 17 in the spacing collar 18 come over the ground or machined pole faces of the magnets 14, it is proposed in the production of the motor to provide a symmetrical arrangement of projecting lugs as an integral part of the collar 18 which will act as keys and exactly fit cut out portions of the magnets 14. These projecting lugs, not shown, are, in effect, location devices.

Operating current is fed to the armature coils by carbon brushes 42. There is only one such brush for each commutator. Each brush is pushed against its associated commutator by the pressure exerted by a spring 44. One spring-loaded brush 42 connects directly to the positive terminal of battery 12 while the other brush 42 connects directly to the negative terminal of battery 12. These brushes may have connections to the battery supply as shown, or such connections can extend at right angles to the commutator faces.

The commutators 22 each have six spaced commutator segments, each segment on one commutator being coupled to a correspondingly positioned segment on the other commutator through a coil winding on the armature.

In the type of motor herein illustrated and described, six independent armature circuits are employed, the brushes and commutators being so designed that five circuits are active simultaneously cutting flux lines as the armature rotates, while one is being commutated. This arrangement ensures excellent self-starting qualities.

A highly simplified view of the magnetic circuit showing the bare armature core, permanent magnets, the annular spacing collar 18, commutators and brushes, is shown in Fig. 9. It should be noted that the gaps between the magnet poles and the armature are as small as possible.

The manner in which the components of the rotor are assembled together may best be understood from an inspection of Fig. 5. Each commutator 22 is spaced from the armature core by means of an insulating disc 46. The rotor is secured to the eccentrics 26 by dowel pins 45. Although the coil windings are not shown in Fig. 5 so as not to detract from the simplicity of illustration, the coil ends of the armature windings are soldered onto the narrow bent-over lugs at the top of the commutator segments as at the location designated 47.

Considered from one viewpoint, the two similar commutators 22 oppositely disposed with respect to the armature 20 can be viewed as a single split commutator because both are essential to the rotation of the rotor. The particular arrangement of the two commutators achieves perfect mechanical and electrical symmetry of all parts of the rotor. It should be observed that every element of the motor on one side of a vertical center line has a duplicate or corresponding element on the other side of the same center line.

Because the efficiency of this type of motor is largely dependent on the maintenance of a high flux density through the armature, the mechanical clearances between the magnets and armature faces may be kept very small using the simplest manufacturing processes—a condition which in conventional rotor-inside-stator types of motor is only attainable by accurate and expensive components and assembly.

In any motor driving a shaver cutting head, high speed with adequate torque is a desirable feature for obvious reasons. To achieve high speed, not only must mechanical friction be reduced to a minimum, but dynamic balance must be as nearly perfect as possible. Electric shavers having oscillating shears in the cuting head utilize motor-driven cams or eccentrics to provide the oscillatory motion, and, quite clearly, the use of a single cam or eccentric on the motor spindle introduces an out-of-balance rotating mass which, unless compensated, limits speed and causes excessive bearing wear.

In the shaver of the present invention, two cutting heads are provided, to actuate which there are two rocker arms 30 of plastic or metallic material and two eccentrics or cams 26 symmetrically disposed on the axial length of the spindle but on opposite sides of the armature.

These eccentrics or cams are also disposed radially so that their maximum radii are diametrically opposite, as shown in Fig. 2. This arrangement not only provides perfect dynamic balance of the complete rotor assembly but also ensures that oscillatory motion of the two cutting head shears is equal and opposite in sign at every instant, thus totally eliminating all out-of-balance forces.

Furthermore, as Fig. 1 shows, the novel design of the motor of the invention permits the use of two or more independently actuated cutting heads in sufficient proximity to produce a compact assembly and give effective shaving. The distance between the two eccentrics or cams on the motor spindle can be made identical with the lateral separation of the two cutting heads, thus allowing straight, un-cranked rocker arms as shown and avoiding the introduction of unwanted lateral couples being set up at the rocker arm pivots M.

Such unwanted couples would be unavoidable with cranked arms and would give rise to out-of-balance, speed-limiting forces for which it would be well-nigh impossible to compensate.

An increase in the number of cutting heads in multiples of two could be similarly provided with a perfectly balanced motor and driving mechanism by duplicating the symmetrically-balanced forks and eccentrics in proper relation to one another.

A further improvement of the invention which is applicable to this and other designs of dry shaver is provided at the point where the rocker arms 30 engage with the moving shear blade. In existing types of electric dry shaver, it is customary to provide a hold, groove or other means of engagement between the driving arm and the moving shear blade. An accurate fit of the two components at this point is impossible by reason of the arc of oscillation of the driving arm and some mechanical clearance must be initially provided. With continuous use of the shaver, this clearance in time increases, causing excessive noise and vibration, in addition to a steady diminution in the intended travel of the moving shear blade and therefore a diminution in the rate of shaving and the efficiency of the shaver and an increase in the noise. The improvement here incorporated is the provision for example of a resilient component 51 on the end of the rocker arm, as shown in Fig. 2. This component may consist of an elastic or compressible rubber or suitable plastic cap attached to the driving end of the rocker arm and forming a snug fit in the groove, hole, or other device for engagement in the moving shear blade. Alternatively, it may be a spring or springs (U-shaped or bent hair spring type) attached either to the moving shear blade or to the rocker arm in such a manner that the sudden change of direction of movement of the rocker arm end is cushioned and by this means the reversal of movement of the moving shear blade is smooth and noiseless. This arrangement distinguishes from the brute force drive methods of prior shavers.

In the conventional dry shaving heads of the horizontally reciprocating type it is customary for both inner and outer teeth and slots to be parallel to one another and at right angles to the direction of oscillatory motion. The abrupt attack of the shearing blades on the hairs gives rise to a very transient (sudden) type of loading on the shaving mechanism and a partially tearing action on the hairs. Such undesirable effects are overcome by one feature of the invention which comprises a cutter operating on a progressive shearing principle somewhat similar to the action of a pair of scissors when cutting threads in which the thread is sandwiched at an acute angle between the cutting edges of the blades. This cutting head of the invention thus provides a true shearing action and minimizes abrupt and sudden transient loads on the motor and shears, also ensures a cleaner, smoother, and quicker shaving, with resulting longer life of the moving parts.

Figure 10 shows one novel and preferred arrangement of the inner cutter for achieving a progressive shearing action. In Figure 10, the metal cutter 50 constituting the novel shear blade is molded in or retained in a suitable plastic or metal base plate 52. The metal cutter 50 is made of a spring steel strip folded along its edges to simulate a symmetrical sawtooth configuration with straight sides, to thereby provide a true shearing action having a diagonal shearing moment. The peaks and troughs of the sawtooth preferably have a minimum radius, as shown, sufficient to provide a maximum length of straight cutting edge on the sawtooth. The dash line circle indicates the location where the driving end of the rocker arm is positioned underneath the inner blade. The outer blade for the cutting head is not shown and is assumed to be of the conventional type used for horizontally reciprocating heads, wherein the teeth and slots are parallel to one another and at right angles to the direction of oscillatory motion. It should be understood that the inner shear of Fig. 1 is not to scale and is exaggerated in size in order to more clearly illustrate the principles of the invention.

An alternative arrangement to Fig. 10 but operating on the same general principles described above in connection with Fig. 10 is shown in Fig. 11 wherein the metal sliding cutter 56 (inner shear blade) is an extruded or rolled solid steel section having a symmetrical sawtooth configuration so as to provide a diagonal shearing moment. The ends 58 indicate arms which can be used to guide the movement of the inner shear 56 as it slides to and fro in a suitable holder, not shown. Here again, the inner shear blade 56 has been shown grossly exaggerated in size. As mentioned above in connection with Fig. 10, the inner blade 56 is designed to cooperate with a conventional outer blade of the type used in dry shavers of the horizontally reciprocating type.

An advantage of the very thin folded steel strip method of construction of the inner cutting shear of Fig. 10 is that there is always present the same perfect surface on the cutting edges of the inner shearing blades despite wear with time. This is because the walls of the very thin folded steel strip are smooth on both sides, and this method of construction ensures that this shall be so without the necessity of expensive if not impossible machining operations.

A further improvement applicable to this and other designs of battery-operated electric dry shavers is the provision of a simple means of conversion of the shaver from battery to electric supply mains operation, for the benefit of users domiciled for periods where access to such supply is available and convenient. Such means would consist of a unit comprising a transformer and rectifier whose output would be matched to the motor requirements, and whose physical size and design would be such that it could be inserted in the space normally occupied by the battery 12. A suitable electric cord could then couple the transformer-rectifier unit within the plastic housing 10 through a suitable aperture therein to the external power supply means. Such rapid means of conversion would clearly provide travelers with an electric dry shaver operable in any part of the world without exception.

In summation, the present invention provides a special high efficiency miniature electric motor in which symmetry (and therefore electrical and mechanical performance) is an important and outstanding feature of the motor design, a novel electric dry shaver (preferably battery-operated) using this special high efficiency motor, and a novel and improved cutter or shear which effects a diagonal shearing moment or progressive shearing action in the cutting head of the electric dry shaver.

What is claimed is:

1. An electric shaver comprising a pair of parallelly arranged coextensive shaving heads arranged side-by-side each of which has adjacent thereto a movable shaving cutter capable of reciprocating motion in a plane, a motor including an armature having a substantially circular core whose diameter is greater than the length of its longitudinal axis, similarly constructed commutators symmetrically mounted on opposite sides of said core, said armature having a plurality of coil windings in proximity to said core, each coil winding having terminals connected to segments on both commutators, a spindle for said armature extending through the centers of and beyond said commutators, eccentrics mounted on said spindle and disposed on opposite sides of and equally distant from said armature, said eccentrics being mounted 180 degrees out-of-phase with respect to each other, and levers between said eccentrics and said cutters for translating the motion of said eccentrics to reciprocating motion of the cutters in a plane, whereby said cutters are caused to travel simultaneously in opposite directions.

2. A battery-operated electric shaver comprising a pair of parallelly arranged coextensive shaving heads arranged side-by-side each of which includes a shaving cutter capable of reciprocating motion in a plane, a housing containing therein a motor including an armature having a substantially circular core whose diameter is greater than the length of its longitudinal axis, similarly constructed commutators symmetrically mounted on opposite sides of said core, said armature having a plurality of coil windings in proximity to said core, each coil winding having terminals connected to segments on both commutators, a spindle for said armature extending through the centers of and beyond said commutators, eccentrics mounted on said spindle and disposed on opposite sides of and equally distant from said armature, said eccentrics being mounted 180 degrees out-of-phase with respect to each other, levers between said eccentrics and said cutters for translating the motion of said eccentrics to reciprocating motion of the cutters in a plane, whereby said cutters are caused to travel simultaneously in opposite directions, and a battery within said housing positioned beneath said motor, said battery having one terminal coupled to one commutator and its other terminal coupled to the other commutator.

3. A battery-operated electric shaver comprising a pair of parallelly arranged coextensive shaving heads arranged side-by-side each of which includes a shaving cutter capable of reciprocating motion in a plane, a housing containing therein a motor including an armature having a substantially circular core whose diameter is greater than the length of its longitudinal axis, similarly constructed commutators symmetrically mounted on opposite sides of said core, said armature having a plurality of coil windings in proximity to said core, each coil winding having terminals connected to segments on both commutators, a spindle for said armature extending through the centers of and beyond said commutators, eccentrics mounted on said spindle and disposed on opposite sides of and equally distant from said armature, said eccentrics being mounted 180 degrees out-of-phase with respect to each other, straight and parallel levers between said eccentrics and said cutters and positioned symmetrically on opposite sides of said armature for translating the motion of said eccentrics to reciprocating motion of the cutters in a plane, whereby said cutters are caused to travel simultaneously in opposite directions, and a battery within said housing positioned beneath said motor, said battery having one terminal coupled to one commutator and its other terminal coupled to the other commutator.

4. An electric shaver comprising a pair of parallelly arranged coextensive shaving heads arranged side-by-side each of which has adjacent thereto a movable shaving cutter capable of reciprocating motion in a plane, a motor including an armature having a substantially circular core whose diameter is greater than the length of its longitudinal axis, commutators symmetrically mounted on opposite sides of said core, a spindle for said armature extending through the centers of and beyond said commutators, eccentrics mounted on said spindle and disposed on opposite sides of and equally distant from said armature, said eccentrics being mounted 180 degrees out-of-phase with respect to each other, and straight levers between said eccentrics and said cutters for translating the motion of said eccentrics to reciprocating motion of the cutters in a plane for causing said cutters to travel simultaneously in opposite directions and always at an 180 degree out-of-phase relation.

5. A battery-operated electric shaver comprising a pair of parallelly arranged coextensive shaving heads arranged side-by-side each of which includes a shaving cutter capable of reciprocating motion in a plane, a housing containing therein a motor including an armature having a substantially circular core whose diameter is greater than the length of its longitudinal axis, commutators symmetrically mounted on opposite sides of said core, said armature having a plurality of coil windings in proximity to said core, each coil winding having terminals connected to segments on both commutators, a spindle for said armature extending through the centers of and beyond said commutators, eccentrics mounted on said spindle and disposed on opposite sides of and equally distant from said armature, said eccentrics being mounted 180 degrees out-of-phase with respect to each other, levers between said eccentrics and said cutters for translating the motion of said eccentrics to reciprocating motion of the cutters in a plane, whereby said cutters are caused to travel simultaneously in opposite directions, said housing having a space beneath said motor for accommodating a battery and means for coupling the terminals of said battery to said commutators, the center line distance between said levers at the location of said eccentrics being the same as the center line distance between said levers at the location of said cutters, whereby undesired lateral couples in the power transmission and associated power loss, vibration, wear and noise are eliminated.

References Cited in the file of this patent
UNITED STATES PATENTS

| | | | |
|---|---|---|---|
| 2,164,425 | Rand | July 4, | 1939 |
| 2,178,669 | Lougheed | Nov. 7, | 1939 |
| 2,202,633 | Holsclaw | May 28, | 1940 |
| 2,203,021 | Jones | June 4, | 1940 |
| 2,212,858 | Eickemeyer | Aug. 27, | 1940 |
| 2,221,639 | Johnson et al. | Nov. 12, | 1940 |
| 2,232,717 | Monnet | Feb. 25, | 1941 |
| 2,264,033 | Youhouse | Nov. 25, | 1941 |
| 2,266,037 | Henninger et al. | Dec. 16, | 1941 |
| 2,272,123 | Te Pas et al. | Feb. 3, | 1942 |
| 2,287,337 | Zimmermann | June 23, | 1942 |
| 2,287,686 | Jones | June 23, | 1942 |
| 2,309,431 | Alexay | Jan. 26, | 1943 |
| 2,314,068 | Benner | Mar. 16, | 1943 |
| 2,314,073 | Campbell | Mar. 16, | 1943 |
| 2,347,869 | Amdur | May 2, | 1944 |
| 2,445,790 | Lonne | July 27, | 1948 |
| 2,465,446 | Gorfin et al. | Mar. 29, | 1949 |
| 2,493,082 | Nehrke | Jan. 3, | 1950 |
| 2,595,870 | Morganson | May 6, | 1952 |